Figure 1:
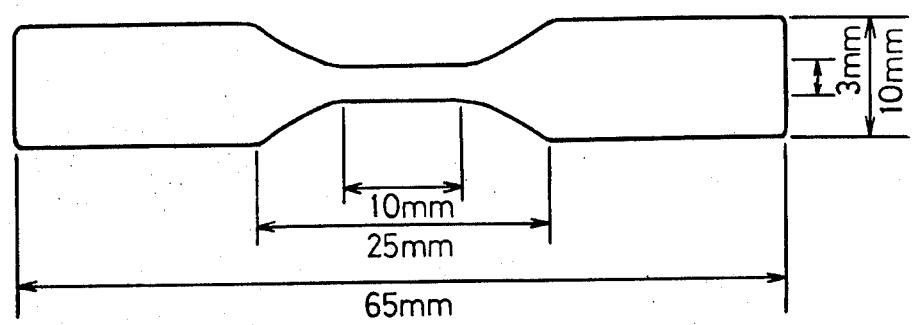

United States Patent [19]

Sano et al.

[11] 4,140,605
[45] Feb. 20, 1979

[54] CROSSLINKABLE COMPOSITION

[75] Inventors: Takezo Sano, Takatsuki; Tadanori Inoue, Ibaraki; Yukikazu Uemura, Amagasaki; Akihiro Furuta, Takatsuki, all of Japan

[73] Assignee: Sumitomo Chemical Company, Limited, Osaka, Japan

[21] Appl. No.: 789,652

[22] Filed: Apr. 21, 1977

Related U.S. Application Data

[63] Continuation-in-part of Ser. No. 668,861, Mar. 22, 1976, abandoned.

[30] Foreign Application Priority Data

Mar. 22, 1975 [JP] Japan ............................. 50-34821

[51] Int. Cl.² .......................... C08F 2/50; C08F 4/00
[52] U.S. Cl. .......................... 204/159.12; 204/159.15; 204/159.16; 204/159.19; 204/159.23; 260/850; 260/856; 427/54
[58] Field of Search ............ 204/159.12, 159.15, 204/159.16, 159.23, 159.19; 427/54; 260/67.6 R

[56] References Cited

U.S. PATENT DOCUMENTS

| | | | |
|---|---|---|---|
| 3,821,145 | 6/1974 | Walus | 260/885 X |
| 3,899,611 | 8/1975 | Hall | 427/54 |
| 3,919,350 | 11/1975 | Iwasawa et al. | 260/67.6 R X |
| 3,935,330 | 1/1976 | Smith et al. | 427/41 |
| 3,960,983 | 6/1976 | Blank | 260/67.6 R X |
| 3,974,303 | 8/1976 | Iwase et al. | 427/54 X |

*Primary Examiner*—Walter C. Danison
*Attorney, Agent, or Firm*—Birch, Stewart, Kolasch and Birch

[57] ABSTRACT

A crosslinkable composition comprising:

(I) a melamine compound of the formula:

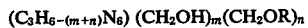

$$(C_3H_{6-(m+n)}N_6)(CH_2OH)_m(CH_2OR)_n$$

wherein R is an alkyl group having 1 to 4 carbon atoms, m is from 0 to 6, n is from 0 to 6 and m + n is from 1.5 to 6, or its condensate having an average condensation degree of not more than 4;

(II) a compound having at least two functional groups condensable with the component (I) and an average molecular weight of not less than 1,000;

(III) a compound having an ethylenically unsaturated linkage photopolymerizable by actinic light;

(IV) a photopolymerization initiator; and (V) a thermal polymerization inhibitor.

10 Claims, 1 Drawing Figure

CROSSLINKABLE COMPOSITION

This is a continuation-in-part application of our copending application Ser. No. 668,861, filed Mar. 22, 1976 now abandoned.

The present invention relates to a crosslinkable composition. More particularly, it relates to a photo- and heat-curable composition which can provide a cured product having favorable physical properties within a short period of time.

In various compositions such as inks and paints, their components are usually diluted with solvents, and their performances are carried out by air-drying or heating for solvent removal or hardening. The performances in such manner require a relatively long period of time frequently with exposure to high temperatures, thus causing the following disadvantages: the operation efficiency is not sufficiently high; a color change occurs and the kind of the usable colorants is limited; the coating layer flows during the hardening so that a uniform coating film is hardly obtainable; the evaporated solvent makes the working environment worse in terms of offensive smell, toxicity and inflammability, etc.

In order to overcome these drawbacks, photopolymerization has been widely applied to various technical fields, since the use of a solvent can be avoided and the hardening can be accomplished rapidly at room temperature. Advantageously, photopolymerization is suitable for the manufacture of fine articles by the use of a negative film. In addition, the degree of polymerization can be easily controlled by the irradiation amount of actinic light.

Unfortunately, however, photopolymerization has a great disadvantage in that polymerization is not accomplished satisfactorily when actinic light can not reach the material. For instance, opaque materials, deeply colored materials, thick materials and the like are hardly cured to a satisfactory extent. Thus, the application of photopolymerization has been still restricted.

For solving the said problem, the present inventors have attempted to eliminate the disadvantage in photopolymerization by subsequent or simultaneous thermal condensation. While such attempt was previously made in U.S. Pat. No. 3,935,330, the physical properties of the resulting cured product is not satisfactory so that the field of application is considerably restricted. Namely, the cured product according to the said U.S. patent is sufficient in hardness but not sufficient in tensile strength. In addition, it is relatively brittle. Therefore, satisfactory resistance to bending and impact is not obtainable. These disadvantageous properties are particularly unfavorable when the formation of a coating film or the production of a shaped article is desired. In the present invention, there is provided successfully a crosslinkable composition which can afford a cured and hardened product having excellent physical properties.

The crosslinkable composition of the present invention comprises:

(I) a melamine compound of the formula: $(C_3H_{6-(m+n)}N_6)(CH_2OH)_m(CH_2)OR)_n$ wherein R is an alkyl group having 1 to 4 carbon atoms, m is from 0 to 6, n is from 0 to 6 and m + n is from 1.5 to 6, or its condensate having an average condensation degree of not more than 4;

(II) a compound having at least two functional groups condensable with the component (I) and an average molecular weight of not less than 1,000;

(III) a compound having an ethylenically unsaturated linkage photopolymerizable by actinic light;

(IV) a photopolymerization initiator; and (V) a thermal polymerization inhibitor.

As the component (I), the melamine compound or its condensate as defined above is usable. Particularly preferred are those wherein R is methyl or butyl. Specific examples include hexamethylmethoxymelamine, hexamethylbutoxymelamine, etc. The amount of the component (I) in the composition of the invention may depend on the amount of the functional groups condensable with the component (I) present in the component (II) and (III), and the molar ratio of the total amount of —$CH_2OH$ and —$CH_2OR$ in the component (I) to the total amount of the functional groups condensable with the component (I) present in the components (II) and (III) is usually from 0.1 to 5.0, preferably from 0.5 to 1.0. When the component (I) is used in such amount that the said molar ratio is less than 0.1, the effect due to the component (I) is not sufficiently exhibited because of a lesser degree of condensation. When the said molar ratio is more than 5, the effect is not so much increased and yet the cured product obtained from the resulting composition is made more brittle.

As the component (II), there may be used a compound having at least two functional groups condensable with the component (I) and an average molecular weight of not less than 1,000 (hereinafter referred to as "Compound A"). Examples of the functional group include alcoholic —OH, —COOH, —CONHR',

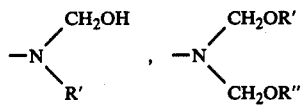

etc., R' and R" being each hydrogen or alkyl such as methyl, ethyl or propyl. Thus, Compound A may be, for instance, alcohols, carboxylic acids, amides or methylol amides which do not inhibit the photopolymerization. Also, Compound A may be prepolymers or polymers having a molecular weight of not less than 1,000, preferably not less than 2,000. For increasing the strength of the cured product, Compound A of higher molecular weight is preferably employed. The use of said compound having a molecular weight of less than 1,000 can still afford a cured product of high hardness but its strength is not sufficient.

Specific examples are as follows: partially acetylated celluloses, partially or wholly saponified polyvinyl acetates, partially or wholly saponified products of copolymers of vinyl acetate with other monomers, homopolymers of acrylic acid or methacrylic acid or copolymers of these acids with other monomers, homopolymers of acrylic amide or methacrylic amide or copolymers of these amides with other monomers, homopolymers of methylol acrylic amide or copolymers of this amide with other monomers, glyptal resins, epoxy resins, unsaturated polyesters, etc. Among them, the use of unsaturated polyesters is particularly preferred since the crosslinking reaction with the component (III) may take place simultaneously so as to give a cured product having excellent properties, for example, high tensile strength and bending strength.

The component (III) may be a compound containing an ethylenically unsaturated linkage photopolymerizable by actinic light. Specific examples are styrene compounds (e.g. styrene, methylstyrene, dimethylstyrene, chlorostyrene, chloromethylstyrene), acrylic ester compounds (e.g. methyl acrylate, ethyl acrylate, propyl acrylate, butyl acrylate, cyclohexyl acrylate, ethylene glycol diacrylate, diethylene glycol diacrylate, triethylene glycol diacrylate), methacrylic ester compounds (e.g. methyl methacrylate, ethyl methacrylate, propyl methacrylate, butyl methacrylate, cyclohexyl methacrylate, ethylene glycol dimethacrylate, diethylene glycol dimethacrylate, triethylene glycol dimethacrylate), vinyl esters of carboxylic acids (e.g. vinyl acetate), vinylpyrrolidone, diallyl phthalate, etc.

The component (III) may be also the one having at least one functional group condensable with the component (I) in addition to an ethylenically unsaturated linkage photopolymerizable by actinic light. The use of the compound of this type is particularly preferred when Compound A having no ethylenic unsaturation is employed as the component (II).

Specific examples include acrylic acid, hydroxyl group-containing acrylic esters (e.g. 2-hydroxyethyl acrylate, 2-hydroxypropyl acrylate, glycerol monoacrylate, glycerol diacrylate, trimethylolpropane monoacrylate, trimethylolpropane diacrylate, pentaerythritol monoacrylate, pentaerythritol diacrylate, pentaerythritol triacrylate, diethylene glycol monoacrylate, triethylene glycol monoacrylate), methacrylic acid, hydroxyl group-containing methacrylic esters (e.g. 2-hydroxyethyl methacrylate, 2-hydroxypropyl methacrylate, glycerol monomethacrylate, glycerol dimethacrylate, trimethylolpropane monomethacrylate, trimethylolpropane dimethacrylate, pentaerythritol monomethacrylate, pentaerythritol dimethacrylate, pentaerythritol trimethacrylate, diethylene glycol monomethacrylate, triethylene glycol monomethacrylate), acrylic amide compounds (e.g. acrylic amide, N-methylacrylic amide, N-methylolacrylic amide, N,N-dimethylolacrylic amide), methacrylic amide compounds (e.g. methacrylic amide, N-methylmethacrylic amide, N-methylolmethacrylic amide, N,N-dimethylolmethacrylic amide), etc. Among them, the use of 2-hydroxyethyl methacrylate, particularly in combination with unsaturated polyesters as the component (II), is favorable in affording a cured product having excellent physical properties when the production of shaped articles is ultimately desired.

The photopolymerization initiator as the component (IV) may be, for example, benzoin, α-methylbenzoin, α-phenylbenzoin, benzoin methyl ether, benzoin isopropyl ether, benzophenone, anthraquinone, 1-chloroanthraquinone, 2-methylanthraquinone, sodium anthraquinone-α-sulfonate, diphenyl disulfide or the like. It may be used in an amount of 0.1 to 10% by weight based on the total amount of the components (I) and (II). When the amount is less than 0.1% by weight, the physical properties of the cured product obtained from the resulting composition becomes less reproducible owing to the lag in the rate of the photohardening and the inhibiting action of the dissolved oxygen. On the other hand, the use in an amount of more than 10% by weight is disadvantageous, since much further acceleration in the photo-hardening can not be produced.

Examples of the thermal polymerization inhibitor as the component (V) includes phenol type stabilizers such as hydroquinone, methylhydroquinone, tert-butyl catechol and 2,6-di-tert-butyl-p-cresol. It may be employed in an amount of 0.01 to 1% by weight based on the total amount of the components (I) and (II). When the amount is less than 0.01 % by weight, the inhibition of the thermal polymerization becomes insufficient, thus facilitating the gelation of the composition during storage. The use in an amount of more than 1% is undesirable because the photo-hardening may be inhibited.

In the composition of the invention, the components (I), (II), (III), (IV) and (V) are essential. But, other various substances may be incorporated therein as optional components depending on the use and the object. For example, there may be incorporated polymers (e.g. polystyrene, polymethyl acrylate, polymethyl methacrylate, polybutadiene, polychloroprene), plasticizers (e.g. dibutyl phthalate, dioctyl phthalate), paraffin, glass fibers, calcium carbonate, polyolefin powders, dyes, pigments, paints and the like.

In the production of a cured product from the composition of the invention, curing may be accomplished by carrying out photo-hardening and then heat-hardening, or by carrying out these hardenings at the same time. When hardening is not desired in certain regions, such regions can be left uncured, for instance, by exposing to actinic light through a screen or film having a light barrier portion corresponding to the said regions. After the unexposed regions are removed, heat-hardening may be effected to obtain the desired cured product.

The source of actinic light for the photohardening includes a high-pressure mercury lamp, extra high-pressure mercury lamp, carbon arc lamp, ultraviolet fluorescent lamp, xenon lamp and the like. The irradiation time may be from 30 seconds to 30 minutes in general.

The heat-hardening may be performed by the use of an oven, a drier, an infrared lamp or the like. The heating temperature and heating time depend upon the required physical properties of the cured product and are in general from 120 to 200° C. and 5 to 100 minutes, respectively. The higher the temperature and the longer the time, the more completely the heat-hardening proceeds. For further acceleration of the hardening, an acid catalyst such as p-toluenesulfonic acid may be used, for example, in an amount of 1 to 5% by weight based on the component (I).

One of the advantageous characteristics of the crosslinkable composition according to the present invention is that a cured product of high strength is obtainable from such composition since a component of high molecular weight is always included therein.

Another advantageous characteristic is that the time for photo-hardening can be shortened because of the subsequent or simultaneous heat-hardening. Thus, a cured product having desired physical properties is obtainable within a short period of time.

A further advantageous characteristic is that the complete curing of such products as is not sufficiently cured by photo-hardening alone can be successfully accomplished. For example, colored products or thick products are hardly curable by photo-hardening, because a sufficient amount of rays can not reach to the deep portion. The subsequent or simultaneous heat-hardening according to this invention makes possible the manufacture of those products with satisfactory physical properties.

Accordingly, the composition of the invention is useful for production of shaped articles, paints, adhesives, sealants and the like.

Practical and presently preferred embodiments of the invention are illustratively shown in the following examples wherein parts are by weight. The test pieces used in Examples 1 to 3 and Reference Examples 1 to 3 are as shown in FIG. 1 of the accompanying drawing wherein the shape or plane view of each test piece is shown with the indication of the size.

EXAMPLE 1

A resin composition was obtained by blending 70 parts of an unsaturated polyester (acid value, 22; a condensation product of maleic anhydride, isophthalic acid and triethylene glycol in a molar ratio of 2 : 1 : 3; average molecular weight, 2,550), 30 parts of 2-hydroxyethyl methacrylate, 1 part of benzoin isopropyl ether, 0.1 part of hydroquinone and 5 parts of hexamethoxymethyl melamine (Sumimal® M-100, produced by Sumitomo Chemical Company, Limited).

The resin composition was applied onto a polyester film of 12 μ thickness to make a coating layer having a thickness of 0.6 mm, and a glass plate laminated with the same polyester film was contacted closely on the coating layer. The layered product was exposed to a 4 KW high-pressure mercury lamp at a distance of 50 cm for 4 minutes and then cured in an electric oven kept at 150° C. for 7 minutes.

The resulting cured article was tested for the tensile strength at 23° C. as follows: the test piece having the shape shown in FIG. 1 of the accompanying drawing was prepared from the article; the test piece was stretched to rupture at a rate of 5 mm/min; the tensile strength was calculated from the load at the rupture. The strength was 56.0 kg/cm².

EXAMPLE 2

The resin composition was in Example 1 was applied onto a polyester film of 12 μ thickness to make a coating layer having a thickness of 0.6 mm, and a glass plate laminated with the same polyester film was contacted closely on the coating layer. The layered product was cured in an electric oven kept at 150° C. for 10 minutes, during which it was exposed to a 4 KW high-pressure mercury lamp at a distance of 50 cm. The resulting cured article was tested for the tensile strength at 23° C. in the same manner as in Example 1. The strength was 65.0 kg/cm².

REFERENCE EXAMPLE 1

A resin composition was obtained by blending 70 parts of the same unsaturated polyester as in Example 1, 30 parts of 2-hydroxyethyl methacrylate, 1 part of benzoin isopropyl ether and 0.1 part of hydroquinone.

The resin composition was applied onto a polyester film of 12 μ thickness to make a coating layer having a thickness of 0.6 mm, and a glass plate laminated with the same polyester film was contacted closely on the coating layer. The layered product was exposed to a 4 KW high-pressure mercury lamp at a distance of 50 cm for 20 minutes. The resulting cured article was tested for the tensile strength at 23° C. in the same manner as in Example 1. The strength was 48.9 kg/cm².

The same layered product as above was exposed to a 4 KW high-pressure mercury lamp for 60 minutes, and the resulting cured article was likewise tested for the tensile strength at 23° C. The strength was 55.1 kg/cm².

REFERENCE EXAMPLE 2

The resin composition as in Reference Example 1 was applied onto a polyester film of 12 μ thickness to make a coating layer having a thickness of 0.6 mm and a glass plate laminated with the same polyester film was contacted closely on the coating layer. The layered product was exposed to a 4 KW high-pressure mercury lamp at a distance of 50 cm for 4 minutes and then cured in an electric oven kept at 150° C. for 15 minutes. The resulting cured article was tested for the tensile strength at 23° C. in the same manner as in Example 1. The strength was 49.0 kg/cm².

EXAMPLE 3

The resin composition as in Example 1 was applied onto a polyester film of 12 μ thickness to make a coating layer having a thickness of 0.6 mm, and a glass plate laminated with the same polyester film was contacted closely on the coating layer. The layered product was exposed to a 4 KW high-pressure mercury lamp at a distance of 50 cm for a period of time as shown in Table 1 and then cured in an electric oven kept at 150° C. for a period of time as shown in Table 1.

The resulting cured article was tested for the modulus of elasticity at 23° C. as follows: the test piece having the shape shown in FIG. 1 of the accompanying drawing was prepared from the article; the test piece was stretched at a rate of 5 mm/min; the load was plotted against the elongation of the test piece to make a graph and the modulus of elasticity was obtained from the graph. The obtained value is shown in Table 1.

REFERENCE EXAMPLE 3

The resin composition as in Reference Example 1 was applied onto a polyester film of 12 μ thickness to make a coating layer having a thickness of 0.6 mm, and a glass plate laminated with the same polyester film was contacted closely on the coating layer. The layered product was exposed to a 4 KW high-pressure mercury lamp at a distance of 50 cm for a period of time as shown in Table 1 and then cured in an electric oven kept at 150° C. for a period of time as shown in Table 1. The resulting cured article was tested for the modulus of elasticity at 23° C. in the same manner as in Example 3. The obtained value is shown in Table 1.

Table 1

|  | Irradiation time (min) | Heating conditions Temp. (° C.) | Time (min) | Modulus of elasticity (kg/cm²) |
| --- | --- | --- | --- | --- |
| Example 3 | 4 | 150 | 5 | 310 |
|  | 3 | 150 | 15 | 568 |
|  | 3 | 160 | 60 | 1283 |
| Reference Example 3 | 4 | 150 | 5 | 301 |
|  | 3 | 150 | 15 | 399 |
|  | 3 | 160 | 60 | 506 |

EXAMPLE 4

A resin composition was obtained by blending 70 parts of an unsaturated polyester (acid value, 30; a condensation product of fumaric acid, isophthalic acid and triethylene glycol in a molar ratio of 1 : 1 : 2; average molecular weight, 1,870), 30 parts of styrene, 1 part of benzoin, 0.1 part of hydroquinone and 10 parts of hexamethoxymethyl melamine (Sumimal® M-100, produced by Sumitomo Chemical Company, Limited).

The resin composition was applied onto a polyester film of 12 μ thickness to make a coating layer having a thickness of 0.6 mm, and a glass plate laminated with the same polyester film was contacted closely on the coating layer. The layered product was exposed to a 4 KW high-pressure mercury lamp at a distance of 50 cm for 2 minutes, and then cured in an electric oven kept at 160° C. for 15 minutes.

The resulting cured article was tested for the dynamic modulus at 200° C. as follows: the test piece of 55 × 3 cm in size was prepared from the article; and the test piece was tested at a frequency of 110 c/s by means of a Vibron (manufactured by Toyo Sokki Co., Ltd.). The value was $2.0 \times 10^2$ kg/cm$^2$.

REFERENCE EXAMPLE 4

A resin composition was obtained by blending 70 parts of the same unsaturated polyester as in Example 4, 30 parts of styrene, 1 part of benzoin and 0.1 part of hydroquinone.

The resin composition was applied onto a polyester film of 12 μ thickness to make a coating layer having a thickness of 0.6 mm, and a glass plate laminated with the same polyester film was contacted closely on the coating layer. The layered product was exposed to a 4 KW high-pressure mercury lamp at a distance of 50 cm for 20 minutes. The resulting cured article was tested for the dynamic modulus at 200° C. in the same manner as in Example 4. The value was $1.6 \times 10^2$ kg/cm$^2$.

EXAMPLE 5

A resin composition was obtained by dissolving 60 parts of polyvinyl alcohol (average degree of polymerization, 500; saponification degree, 88%; average molecular weight, 22,000) in 120 parts of water and blending the resulting solution with 50 parts of 2-hydroxyethyl methacrylate, 0.2 part of sodium anthraquinone-β-sulfonate and 5 parts of hexamethoxymethyl melamine (Sumimal ® M-100, produced by Sumitomo Chemical Company, Limited).

The resin composition was charged into a casting frame (made of Teflon ®) in a thickness of 1 mm and allowed to stand whereby the moisture was evaporated. After the evaporation was completed, the cast sheet was taken out of the frame, exposed to a 4 KW high-pressure mercury lamp at a distance of 50 cm for 5 minutes and then cured in an electric oven kept at 160° C for 15 minutes.

The resulting cured article was tested for the dynamic modulus at 180° C. in the same manner as in Example 4. The value was 50 kg/cm$^2$.

REFERENCE EXAMPLE 5

A resin composition was obtained by dissolving 60 parts of polyvinyl alcohol (average degree of polymerization, 500; saponification degree, 88%) in 120 parts of water and blending the resulting solution with 50 parts of 2-hydroxyethyl methacrylate and 0.2 part of sodium anthraquinone-β-sulfonate.

The resin composition was charged into a casting frame (made by Teflon ®) in a thickness of 1 mm and allowed to stand whereby the moisture was evaporated. After the evaporation was completed, the cast sheet was taken out of the frame and exposed to a 4 KW high-pressure mercury lamp at a distance of 50 cm for 25 minutes.

The resulting cured article was tested for the dynamic modulus at 180° C. in the same manner as in Example 4. The value was 36 kg/cm$^2$.

REFERENCE EXAMPLE 6

A resin composition was obtained by blending 25 parts of 2-hydroxyethyl acrylate, 50 parts of isodecyl acrylate, 5 parts of neopentyl glycol diacrylate, 20 parts of hexamethoxymethylmelamine, 1 part of p-toluenesulfonic acid (20% aqueous solution), 3 part of benzoin n-butyl ether and 0.1 part of methylhydroquinone.

The resin composition was applied onto a polyester film of 12 μ thickness to make a coating layer having a thickness of 0.6 mm, and a glass plate laminated with the same polyester film was contacted closely on the coating layer. The layered product was exposed to a 4 KW high-pressure mercury lamp and heated in an electric oven in the same manner as in Example 1.

The resulting cured article had a sufficient hardness but was so brittle that a test piece for testing the tensile strength could not be successfully prepared therewith according to the same procedure as described in Example 1.

What is claimed is:

1. A crosslinkable composition consisting essentially of:
   (I) a melamine compound of the formula:

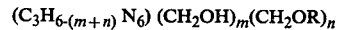

wherein R is an alkyl group having 1 to 4 carbon atoms, m is from 0 to 6, n is from 0 to 6 and m + n is from 1.5 to 6, or a condensate thereof having an average condensation degree of not more than 4;
   (II) a compound having at least two functional groups selected from the group consisting of alcoholic —OH, —COOH, —CONHR'

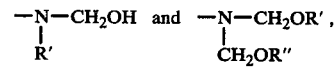

wherein R' and R" are each hydrogen, methyl, ethyl or propyl and having an average molecular weight of not less than 1,000;
   (III) a compound having an ethylenically unsaturated linkage photopolymerizable by actinic light selected from the group consisting of styrenes, acrylic esters, methacrylic esters, acrylic acid, hydroxyl group-containing acrylic esters, methacrylic acid, hydroxyl group-containing methacrylic esters, acrylic amides, methacrylic amides, vinyl esters of carboxylic acids, vinylpyrrolidone and diallyl phthalate;
   (IV) a photopolymerization initiator in an amount of 0.1 to 10% by weight based on the total amount of the compounds (I) and (II); and
   (V) a thermal polymerization inhibitor in an amount of 0.01 to 1% by weight based on the total amount of the compounds (I) and (II), wherein the molar ratio of the total amount of —CH$_2$OH and —CH$_2$OR in the compound (I) to the total amount of the functional groups condensable with the compound (I) in the compounds (II) and (III) is from 0.1 to 5.0.

2. The crosslinkable composition according to claim 1, wherein the compound (II) is selected from the group consisting of alcohols, carboxylic acids, amides and methylol amides.

3. The crosslinkable composition according to claim 2, wherein the compound (II) is selected from the group consisting of partially acetylated celluloses, partially or wholly saponified polyvinyl acetates, partially or wholly saponified products of copolymers of vinyl acetate with other copolymerizable monomers, homopolymers of acrylic acid or methacrylic acid or copolymers of these acids with other copolymerizable monomers, homopolymers of acrylic amide or methacrylic amide or copolymers of these amides with other copolymerizable monomers, homopolymers of methylol acrylic amide or copolymers of this amide with other copolymerizable monomers, glyptal resins, epoxy resins and unsaturated polyesters.

4. The crosslinkable composition according to claim 1, wherein the compound (III) is selected from the group consisting of styrene, methylstyrene, dimethylstyrene, chlorostyrene, chloromethylstyrene, methyl acrylate, ethyl acrylate, propyl acrylate, butyl acrylate, cyclohexyl acrylate, ethylene glycol diacrylate, diethylene glycol diacrylate, triethylene glycol diacrylate, methyl methacrylate, ethyl methacrylate, propyl methacrylate, butyl methacrylate, cyclohexyl methacrylate, ethylene glycol dimethylacrylate, diethylene glycol dimethacrylate, triethylene glycol dimethacrylate, acrylic acid, 2-hydroxyethyl acrylate, 2-hydroxypropyl acrylate, glycerol monoacrylate, glycerol diacrylate, trimethylolpropane monoacrylate, trimethylolpropane diacrylate, pentaerythritol monoacrylate, pentaerythritol diacrylate, pentaerythritol triacrylate, diethylene glycol monoacrylate, triethylene glycol monoacrylate, methacrylic acid, 2-hydroxyethyl methacrylate, 2-hydroxypropyl methacrylate, glycerol monomethacrylate, glycerol dimethacrylate, trimethylolpropane monomethacrylate, trimethylolpropane dimethacrylate, pentaerythritol monomethacrylate, pentaerythritol dimethacrylate, pentaerythritol trimethacrylate, diethylene glycol monomethacrylate, triethylene glycol monomethacrylate, acrylic amide, N-methylacrylic amide, N-methylolacrylic amide, N,N-dimethylolacrylic amide, methacrylic amide, N-methylmethacrylic amide, N-methylolmethacrylic amide, N,N-dimethylolmethacrylic amide, vinyl acetate, vinylpyrrolidone and diallyl phthalate.

5. A crosslinkable composition according to claim 4, wherein the compound (II) is an unsaturated polyester and the compound (III) is 2-hydroxyethyl methacrylate.

6. A method for the preparation of cured articles comprising exposing the crosslinkable composition according to claim 1 to actinic light and then heating whereby said composition is hardened.

7. A method for the preparation of cured articles comprising subjecting the crosslinkable composition according to claim 1 to irradiation with actinic light and heating at the same time.

8. A cured article obtained by hardening the crosslinkable composition according to claim 1.

9. A cured article obtained by the method according to claim 6.

10. A cured article obtained by the method according to claim 7.

* * * * *